June 23, 1970  H. SCHOLL ET AL  3,517,287
SERVO GEAR SHIFT ARRANGEMENT FOR AUTOMOTIVE VEHICLES
Filed Oct. 25, 1966
FIG. 1
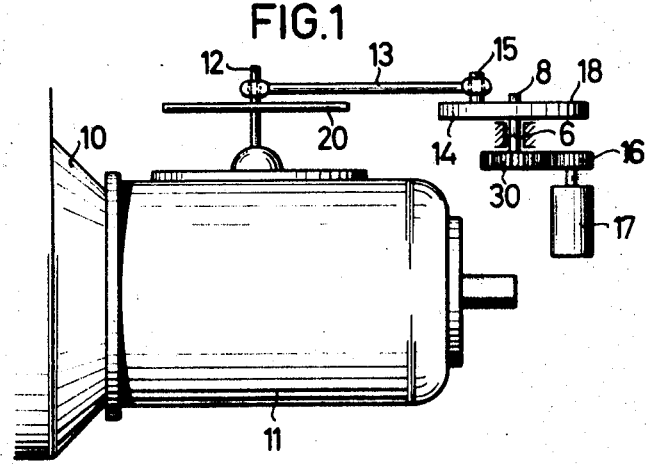
FIG. 2
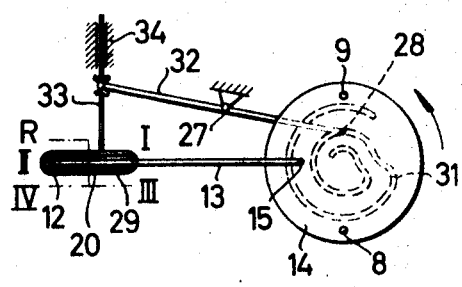
FIG. 4
|    | R | I | II | III | IV |
|----|---|---|----|-----|----|
| T1 |   |   |    |     | ▓  |
| T2 |   |   |    | ▓   | ▓  |
| T3 |   |   | ▓  | ▓   | ▓  |
| T4 |   | ▓ | ▓  | ▓   | ▓  |
INVENTORS
Hermann Scholl
Karl Rilling

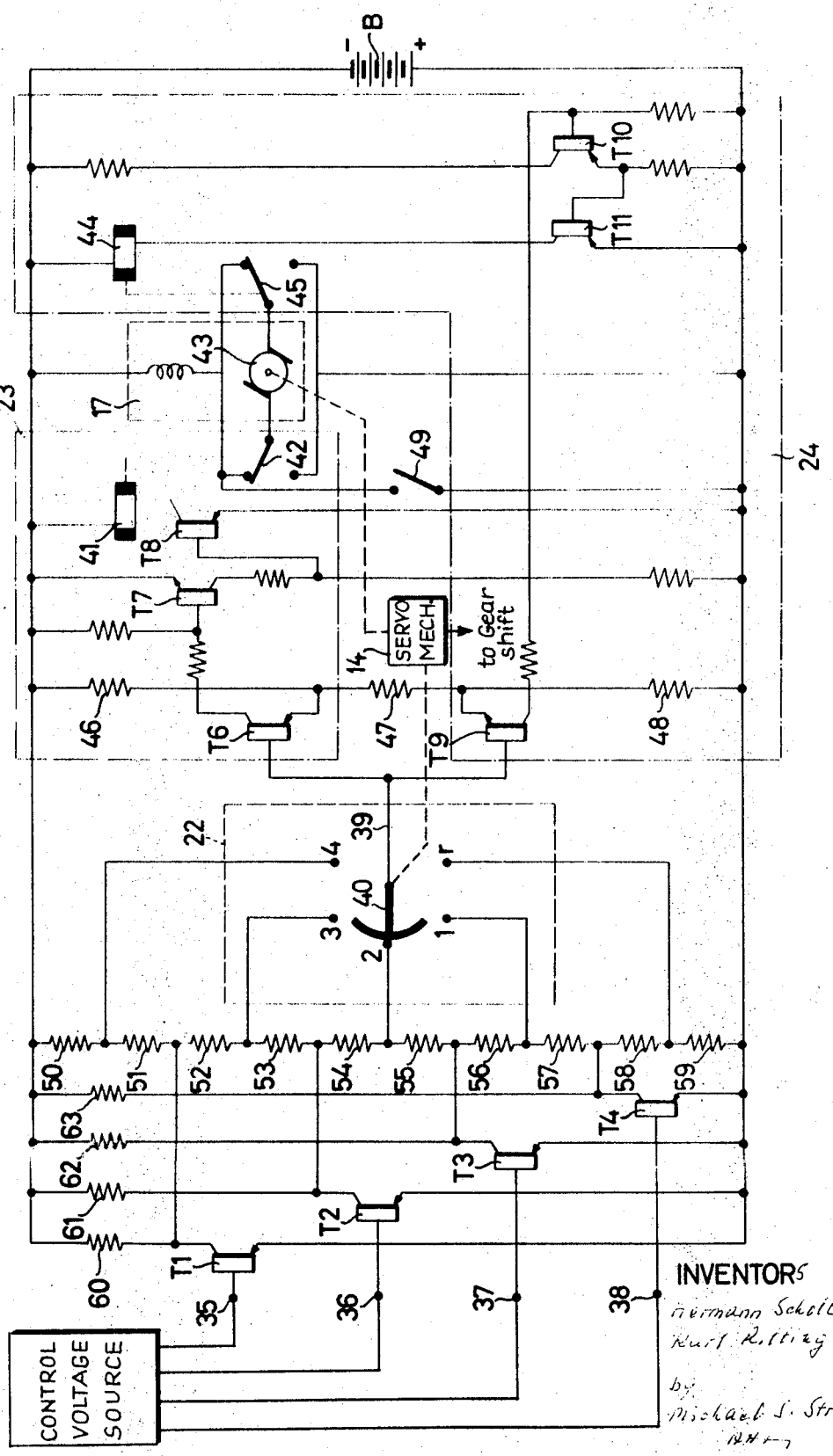

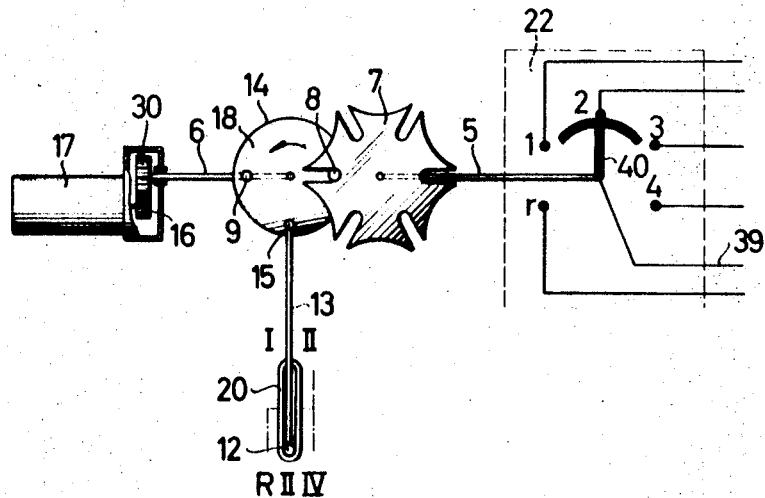
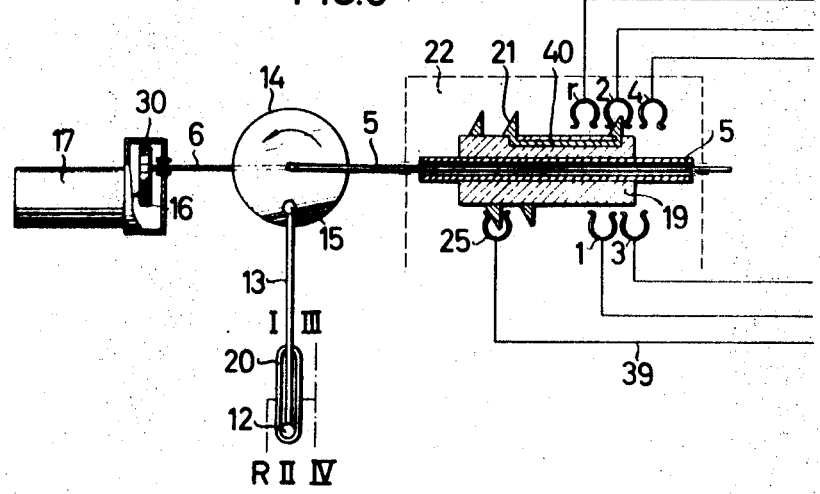

United States Patent Office 3,517,287
Patented June 23, 1970

3,517,287
SERVO GEAR SHIFT ARRANGEMENT FOR AUTOMOTIVE VEHICLES
Hermann Scholl, Stuttgart, and Karl Rilling, Hochdorf, Kreis Esslingen, Germany, assignors to Robert Bosch G.m.b.H., Stuttgart, Germany
Filed Oct. 25, 1966, Ser. No. 589,266
Claims priority, application Germany, Oct. 29, 1965, B 84,298
Int. Cl. G05b 11/01
U.S. Cl. 318—33       8 Claims

ABSTRACT OF THE DISCLOSURE

A control arrangement for actuating the shift mechanism of a motor vehicle. A servo motor is mechanically coupled to the shift mechanism so as to position the latter in accordance with predetermined signals generated as a function of the operating characteristics of the vehicle. The operating voltage for the servo motor is supplied by a switching arrangement which acts upon the servo motor in response to tapped voltages from a voltage divider having transistors connected in parallel with predetermined taps. The transistors function to short circuiting portions of the voltage divider and thereby apply operating signals to the servo motor. A follow-up switch with a movable contact and fixed contacts corresponding to the number of shift positions of the vehicle, is electrically connected to the switching arrangement while the movable contact is mechanically coupled to the servomotor drive.

---

This invention pertains to an arrangement for the automatic control of the gear-shift transmission of an automotive vehicle.

More particularly, the invention relates to an electric-motor-operated gear shift transmission and a servo system therefor which is provided in addition to the gear shifting mechanism and is adapted as an operating control for the electric motor.

It is an object of the invention to provide in servo-arrangements of the class described, an operative connection between the electric motor operated gear shift an associated follower control for the motor, using operating elements already available as well as the simplest possible means so as to reduce the cost of manufacture.

The invention comprises a servo-arrangement for accurately controlling the step-wise shifting of a gear shift for automotive vehicles by means of a control circuit which is under the influence of electrical signals determined by driving conditions. The control circuit contains, for each of the positions of the gear shift, a selectively operative voltage responsive switch governing the operation of an electric motor. The motor operates the gear shift by means of a crank lever which executes half a turn for each of the gear shift steps. The motor is operatively linked to a follower control switch, the movable switch arm of which is connected with the voltage responsive switches, and the positions of which correspond to those of the gear shift.

In accordance with the invention, the above problem has been solved in that the operative link of the electric motor with the follower switch is provided through the medium of a servo-arrangement between the crank lever driving the gear shift and the switch arm of the follower switch. The servo-arrangement operates in a way so that the crank lever causes the switch arm to follow it whereby an unambiguous correlation is provided between the contact positions of the follower switch and of those of the gear shift.

In accordance with a preferred embodiment of the invention the servo-arrangement between the crank lever and the switch arm may include a Maltese drive which consists of a Maltese disk gear rigidly disposed on the axle of the switch and two follower elements eccentrically disposed on the crank lever and diametrically one with respect to the other.

In accordance with a second embodiment of the invention, the switch arm may alternatively be connected with the crank lever for rotation therewith but axially movable relative thereto. The switch arm in this embodiment may be guided along a spiral path, the fixed contacts of the follower switch in correspondence with the progress of the spiral being axially displaced in relation to each other along two diametrically opposed surface lines of a cylinder, the axis of which coincides with that of the switch.

In both of the above described embodiments, the transmission of the movement of the electric motor to the follower switch is accomplished by means of the driving gear already available between the electric motor and the crank lever since the driving gear effects a considerable transformation of the movement of the electric motor, the transmission from the crank lever to the follower switch may be obtained, in place of another transmission, by means of the follower arrangement in accordance with the invention which would be considerably cheaper.

Further details of the invention will be found in the following specification which is given in connection with the embodiments shown in the annexed drawings.

There is shown in:

FIG. 1, the most important mechanical portions of a servo-arrangement for the step-wise shifting of a gear shift for an automotive vehicle together with the housing of the transmission in side view, FIG. 2 a plan view of the servo-arrangement in accordance with FIG. 1 rendered schematically, FIG. 3 the electrical circuit of the servo-arrangement in accordance with FIGS. 1 and 2, FIG. 4 a graphic representation of the operative conditions of the switching transistors used in the circuit of FIG. 3 corresponding to the positions of the gear shift, FIG. 5 portions of the servo-arrangement in accordance with FIGS. 1, 2 and 3 together with the servo-arrangement in accordance with the first embodiment of the invention, in schematic arrangement, and in FIG. 6 portions of the servo-arrangements in accordance with FIGS. 1 and 2 together with the servo-arrangement in accordance with the second embodiment of the invention in schematic form and partially in section.

Construction of the servo-arrangement.

As seen in FIGS. 1 and 2, the shifting lever 12 of a gear shift transmission 11 for an internal combustion motor 10 is operable by means of a crank rod 13 and a confinement 20. As shown in FIG. 2, the shift lever 12 is movable through the customary four positions of the gear shift R, I, II, III and IV. One end of the crank rod 13 is connected with the shift lever 12, the other end is linked with the crank stud 15 eccentrically disposed on a crank member 14. The crank 14 is connected on its axis 6 for common rotation with a gear 30 which is being driven from an electric motor 17 thru another gear 16. The confinement 20 is provided with a rectilinear recess 29 adapted to guide shift lever 12, and is secured to a rod 33 (FIG. 2) which is movable in a rectilinear guide 34 at right angles to the shifting planes I–II and III–IV. The underside of the crank member 14 is provided with a spiral groove 31 serving to guide one end 28 of a lever 32 pivotable about a point 27 and the other end of which is linked with the rod 33.

The electronic control circuit according to FIG. 3 includes a potential divider, disposed across the supply source B, consisting of series connected resistances 50 to 59. Proceeding from the negative potential of the voltage divider 50 to 59, respective potential divider ranges are formed by the first resistance 50 and the second resistance 51, the third resistance 52 and the fourth resistance 53, the fifth resistance 54 and the sixth resistance 55, and so. These ranges each comprise equally large resistance values. The control circuit further includes for each of the operative gear-shift positions a selectively operable switch, comprising respectively of the transistors T1 to T4. Additionally the circuit contains a follower switch shown within dashed lines at 22, as well as two voltage responsive circuits shown within dot-dash lines at 23 and 24 forming a control system for the electric motor 17.

The common points of two adjacent potential divider ranges are respectively connected over the emitter collector paths of the transistors T1 to T4 to the positive side of the supply source B and at the same time to the negative pole of the source B by way of one of the collector resistances 60, 61, 62, and 63. Collector resistances 60, 61, 62 and 63 are considerably smaller than the respective associated range resistances of the potential dividers 50 to 59. The bases of the transistors T1 to T4 are provided with terminals 35 to 38 respectively. An electronic circuit shown in block form in FIG. 3 and indicated as a "Control Voltage Source" has individual connections to the terminals 35 to 38, thus serving to provide various voltages to transistors T1 to T4 in response to driving conditions of the motor vehicle, such as driving speed accelerator pedal positions, and so forth. Such a "Control Voltage Source" is conventional and is shown in British Pat. 970,535, dated Sept. 23, 1964.

The follower switch 22 includes fixed contacts r, 1, 2, 3 and 4, corresponding to the gear shift positions R, I, II, III and IV, indicating "reverse," "first," "second," "third" and "fourth speed." These contacts are respectively connected with the electrical centers of the potential divider ranges 50 to 59. A switch arm 40 is rotatable by the electric motor 17 and is adapted to move across these contacts. The arm 40, the size of which roughly corresponds to the path between three adjacent contacts, is connected with the bases of two transistors T6 and T9 by way of a connection 39. The switch arm 40 is mechanically linked with motor 17 through a servo mechanism 14 in turn is connected to the gear shift as shown in the drawings. The emitters of the transistors T6 and T9 are connected to different points of a potential divider comprised of three resistances 46, 47 and 48, and which is disposed across the potential source B. The transistors T6 and T9 are respectively associated with the control systems 23 and 24 serving as start and stop controls for the forward or reverse operation of the electric motor 17. The control system 23 for starting and stopping of the forward operation of motor 17 includes two transistors T7 and T8 serving to amplify the output of transistor T6 and also a relay 41 connected in the collector circuit of transistor T8 and by means of which an alternating contact 42 may be activated. The movable contact 42 is connected to one of the terminals of armature 43, in its rest position by way of the exciter field to the negative polarity, and in its operated or working position to the positive polarity of source B. Correspondingly, the control system 24 serving as the on and off control for the reverse operation of the motor 17, includes two transistors T10 and T11 for the purpose of amplifying the output of transistor T9 as well as a relay 44 which operates on alternating contact 45. Contact arm 45 is connected to the other supply terminal of armature 43 and with its contact in rest position by way of the exciter field to the negative polarity and with its contact in the operated position to the positive polarity of source B. Other elements in the control circuits for the electric motor comprised of control systems 23 and 24 only serve to provide the necessary potential and current values and are therefore not shown in greater detail.

The operating conditions of transistors T1 to T4 are indicated in FIG. 4 as they correspond to the respective gear shift positions. The cross hatched fields indicate the transistors in the conductive mode.

FIG. 5 schematically illustrates portions of the servo-arrangement in accordance with FIGS. 1, 2 and 3 together with the follower arrangement in accordance with the first named embodiment of the invention. A Maltese drive disk 7 is rigidly affixed to the switch axis 5 which also carries in fixed relation the switch arm 40 secured. The Maltese disk 7 is arranged so as to effect a follower movement of the studs 8 and 9 disposed eccentrically on the upper surface 18 of the crank member 14 and diametrically opposed with respect to each other (also shown in FIGS. 1 and 2).

The follower arrangement in accordance with the second embodiment of the invention is shown in FIG. 6. The Maltese drive is here replaced with a rigid connection of the switch axle 5 with the crank axle 6. A hollow cylindrical insulator element 19 which carries the switch arm 40 is shown here disposed for rotation but axially shiftable in respect with the switch axis 5. The switch arm 40 is partially set into the insulating element 19 and partially extending outside thereof. The exposed portion of the switch arm 40 comprises a sliding contact which is here shown having a spiral form. The size of the sliding element relative to its associated contact corresponds almost to a full rotation of the insulating element 19. Swith arm 40 is electrically connected with a contact spiral 21 which encompasses the insulating element 19 and which has the same pitch as the slider of the switch arm 40. The contact spiral 21 makes sliding contact with a rigidly arrayed countercontact 25 electrically connected to the conductor 39. The contacts r, 1, 2, 3, 4 are displaced axially with respect to each other on two diametrically opposed surface lines of a cylinder coaxial with that of switch axle 5.

OPERATION OF THE SERVO-ARRANGEMENT

The position change in the gear shift is initiated from the electronic control circuit shown as "Control Voltage Source" connected to the terminals 35 through 38. For the purpose of the following discussion it is assumed that the transmission is in the shift position II and that the third position is to be attained in response to the control circuit.

In FIGS. 3, 5 and 6 of the drawing, the switch arm 40 is shown in a position which corresponds to the operative second gear of the shift. Accordingly, transistors T1 and T2 are inoperative and transistors T3 and T4 are conducting. Consequently, the connecting point between resistances 55 and 56 is placed on the positive side of the supply source B which now acts as a reference potential (zero volts). The resistances 50 to 59 all have the same value of 2 kilo-ohms. The collector resistances 60 to 63 similarly equal to one another, having a considerably smaller value, however, which amounts to 100 ohms, respectively. Due to this resistance relationship, the connecting point resistances 53 and 54 connected to the collector of transistor T2 is practically at negative potential (—6 volts) of the supply potential source B. Accordingly, a potential of —3 volts is applied to the electrical center of the potential divider range 54 and 55, the only operative region. This potential is supplied over the contact 2 and the switch arm 40 thru the follower switch 22 to the base of transistors T6 and T9 which are connected to the input of the motor control system. The potential divider relationship of the low ohmic potential divider comprised of resistances 46, 47 and 48 has such a value that the emitter potential of the pnp transistors T6 comprises approximately —3.5 volts and that of the npn transistor T9 about —2.5 volts. Consequently, both transistors T6 and T9 are blocked and thereby the associated amplifier transistors T7, T8, T10 and T11, the relays 41 and 44 also being kept inoperative thereby. The servo-circuit therefore is inactive, thus disconnecting motor 17.

Should a signal from the "Control Voltage Source" require, for instance, as a consequence of increased driving speed, that the third speed position be attained, transistor T2 changes from a blocked to a conductive mode. The potential at the electrical center of the potential divider range 54 and 55 thereby rises to zero volts, while a potential of −3 volts appears at the electrical center of the potential divider region 52 and 53. Transistor T9 becomes conductive and thereby puts transistors T10 and T11 associated therewith into circuit whereby relay 44 reverses the position of its contact 45 and energizes the electric motor 17. The shaft of the motor 17 causes the crank lever 14 to turn in the direction of the arrows shown in FIGS. 2, 5 and 6. The crank lever 14 operates the shift lever 12 by means of the crank rod 13 and the confinement 20. During the first quarter turn, the crank 14 pushes the lever 12 to the center of the guide recess 29 while the lever 32 is, thru its right end 28 is guided in the spiral groove 31 along a curvilinear portion having constant radius. The confinement 20 maintains its position in the shifting plane I–II. After the first quarter turn however, the crank 14 will cause the right end 28 of the lever 32 to be moved radially outward in the curvilinear groove 31 and the confinement 20 will be displaced by means of rod 33 into the shift plane III–IV from the shift plane I–II. This position is maintained by the confinement 20 during the next quarter turn of the crank lever 14 while the crank rod 13 causes the shift lever 12 to be displaced further within the confinement 20 into the position III.

Simultaneously, the switch arm 40 is moved from contact 2 to contact 3 by means of one of the servo-arrangement in accordance with FIGS. 5 or 6. Very soon after about ⅙ of this path, contact 3 makes connection with the wide slider of switch arm 40 so that contacts 2 and 3 are conductively connected. The resistances 54 and 55 are thereby connected in parallel with resistance 53, transistor T9 thereby obtaining a potential of −1.5 volts at its basis and still remaining conductive. Shortly before switch arm 40 reaches the position corresponding to the third gear, the connection with contact 2 is interrupted. The potential at the base of transistor T9 is thereby raised to −3 volts transistor T9 as well as associated transistors T10 and T11 being blocked and relay 44 as well as electric motor 17 being rendered inoperative thereby.

Corresponding steps take place during the shift from the third to the second position. Thus, transistors T6, T7 and T8 are brought into the conductive mode, relay 41 with its contact 42 thereby causing electric motor 17 to reverse its direction while effecting a movement of the mechanical elements in the opposite sense.

If the mechanical energy available in the servo-arrangement during the changeover of the shift be relatively large and the gear shift itself be easily operable the servo-system may over-run its rest position. If, for instance, during the changeover from the second into the third position of the gear shift, the contact 4 makes a connection with the switch arm 40, transistor T6 will become conductive and the electric motor 17 will turn in the opposite direction until the connection between contact 4 and the switch arm 40 is again interrupted.

It is possible in the case of an easily operable gear shift if short shifting periods are desired that the servo system due to the above described effects will hunt back and forth about its rest position and under certain conditions may not attain this position at all. In order to prevent this condition a braking switch 49 is provided which acts as a circuit maker and to thereby cause the armature 43 of the electric motor 17 to be short-circuited.

The follower arrangements according to FIGS. 5 and 6 act to transmit the positions of the electrical motor 17 and of the crank lever 14 which are not uniquely associated with the positions of the gear shift to the follower switch 22 in such a manner that an unambiguous correlation is established between the switch positions of the follower switch and those of the gear shift. It should be noted here that the crank lever 14 makes two complete turns when it is passing through all of the positions R, I, II, III, IV.

In the Maltese drive as shown in FIG. 5, the fixed contacts r, 1, 2, 3, and 4 are arranged in a single plane. As a result, the follower switch 22 has only a small dimension in the direction of the switch axis 5. The angular distance between contacts respectively comprises 60 degrees. This corresponds, as related to the crank lever 14, to a reduction ratio of 1.3. In a strict sense this transformation ratio does not remain constant, varying with the cosine of the angle of rotation of crank lever 14 between 1:1 and zero. The value of 1:3, therefore, is a median value only. In the vicinity of the stopping points corresponding to the stationary positions of the gear shift (rotation angle of the crank lever-integral multiple of $\pi$) the transformation ratio is 1:1. Should, instead of the Maltese drive, a gear transmission system be used with a transformation ratio of 1:3, the angular velocity of the switch arm 40 in the vicinity of the stopping points, other things being equal, would be about three times smaller. That is to say, that, for an equal gear tooth backlash, the switching precision of the Maltese drive is three times greater than that of a gear drive transmission.

If sufficient space is available in the direction of switch axis 5, it is possible to use the follower arrangement in accordance with FIG. 6 instead of the Maltese drive. Such an arrangement does not have any disadvantages as compared to the Maltese drive as far as manufacturing technique is concerned.

It should be understood that the specific embodiments of the switch arm 40 and of the contacts r, 1, 2, 3, 4 and 25, as shown in FIGS. 3, 5 and 6 are not limiting for the present invention. More especially, in order to attain high operational reliability, contacts r, 1, 2, 3, 4 and 25, may be formed as safety gas contacts and the switch arm 40 may be provided with movable permanent magnets which would actuate contacts r, 1, 2, 3, and 4.

In place of the above, the follower switch 22 may also be provided with gold contacts and the switch arm 40 may be formed as actuating cam.

It will be understood that various changes and modifications can be made in the above-described embodiments without departing from the spirit and scope of the invention as defined by the appended claims.

What we claim is:

1. A control arrangement for actuating the shift mechanism in a motor vehicle having $n$ shift position comprising, in combination, motor means mechanically coupled to said shift mechanism for positioning the same; voltage-dependent switch means connected to said motor means and applying operating power to said motor means; a source of voltage; voltage dividing means connected in parallel with said source of voltage; $n-1$ selectively actuatable switches connected to said voltage dividing means so that each switch when in operative state short-circuits a predetermined region of said voltage dividing means from one end thereof, said switch bridging the remaining region with substantially low resistance when in the inoperative state; and follow-up switch means having a movable contact and $n$ fixed contacts connected to $n$ tap positions on said voltage dividing means, each tap position providing a predetermined voltage identifying a corresponding shift position of said shift mechanism, said movable contact of said follow-up switch being electrically connected to said voltage dependent switch means and mechanically coupled to said motor means.

2. A control arrangement for actuating the shift mechanism as defined in claim 1 wherein said selectively actuatable switches comprise transistors, said transistors conducting when in the operative state and non-conducting when in the inoperative state.

3. A control arrangement for actuating the shift mechanism as defined in claim 1 wherein said voltage dividing means comprises $2n$ resistors connected in series, taps between two of said resistors being connected to said fixed contacts of said follow-up switch means.

4. A control arrangement for actuating the shift mechanism as defined in claim 3 wherein said resistors all have identical electrical resistance values.

5. A control arrangement for actuating the shift mechanism as defined in claim 1 wherein said movable contact of said follow-up switch means almost contacts three fixed contacts of said follow-up switch means.

6. A control arrangement for actuating the shift mechanism as defined in claim 1 including a Maltese drive mechanism between said movable contact of said follow-up switch and said motor means, said Maltese drive comprising a Maltese drive disk secured to said movable contact of said follow-up switch and rotatable therewith; and a crank member carrying two diametrically opposite and eccentrically located studs cooperating with said Maltese disk.

7. A control arrangement for actuating the shift mechanism as defined in claim 1 wherein said movable contact of said follow-up switch means comprises a helically-shaped member axially slidable upon a rotatable shaft for positioning said movable contact, said fixed contacts of said follow-up switch means being axially displaced from each other along said helically-shaped member and contacting said helically-shaped member at predetermined positions thereof.

8. A control arrangement for step-wise control of a servomechanism for actuation of the shift mechanism in a motor vehicle having $n$ shift position comprising, in combination, motor means mechanically coupled to said shift mechanism for positioning the same; voltage-dependent switch means connected to said motor means and applying operating power to said motor means; a source of voltage; voltage dividing means connected in parallel with said source of voltage; $n-1$ selectively actuatable switches connected to said voltage dividing means so that each switch when in operative state short-circuits a predetermined region of said voltage dividing means from one end thereof, said switch bridging the remaining region with substantially low resistance when in the inoperative state, whereby the full voltage of said source appears across the remaining region of said voltage dividing means; electronic control circuit means connected to said actuatable switches and applying to said switches electrical signals dependent upon the operating state of said vehicle; and follow-up switch means having a movable contact and $n$ fixed contacts connected to a $n$ tap positions on said voltage dividing means, each tap position providing a predetermined voltage identifying a corresponding shift position of said shift mechanism, said movable contact of said follow-up switch being electrically connected to said voltage dependent switch means and mechanically coupled to said motor means and said shift mechanism.

References Cited
UNITED STATES PATENTS

| | | | |
|---|---|---|---|
| 3,080,514 | 3/1963 | Foss et al. | 318—29 |
| 3,194,081 | 7/1965 | Parsons et al. | 318—33 XR |
| 3,297,923 | 1/1967 | Schneider et al. | 318—18 |
| 3,378,742 | 4/1968 | Telkamp | 318—33 |
| 2,755,679 | 7/1956 | Nallinger | 319—9 XR |

BENJAMIN DOBECK, Primary Examiner